US012131585B2

(12) United States Patent
Su et al.

(10) Patent No.: US 12,131,585 B2
(45) Date of Patent: Oct. 29, 2024

(54) PROCESSING SYSTEM, PROCESSING METHOD, AND NON-TRANSITORY STORAGE MEDIUM

(71) Applicant: NEC Corporation, Tokyo (JP)

(72) Inventors: Leiming Su, Tokyo (JP); Tatsuya Shimahara, Tokyo (JP); Hiroaki Morita, Gunma (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/616,226

(22) PCT Filed: Apr. 13, 2020

(86) PCT No.: PCT/JP2020/016266
§ 371 (c)(1),
(2) Date: Dec. 3, 2021

(87) PCT Pub. No.: WO2020/246141
PCT Pub. Date: Dec. 10, 2020

(65) Prior Publication Data
US 2022/0254192 A1 Aug. 11, 2022

(30) Foreign Application Priority Data
Jun. 6, 2019 (JP) ................................. 2019-105904

(51) Int. Cl.
*G06V 10/60* (2022.01)
*G06V 10/141* (2022.01)
*G06V 40/18* (2022.01)

(52) U.S. Cl.
CPC .......... *G06V 40/197* (2022.01); *G06V 10/141* (2022.01); *G06V 10/60* (2022.01); *G06V 40/193* (2022.01)

(58) Field of Classification Search
CPC .... G06V 40/197; G06V 10/141; G06V 10/60; G06V 40/193; G06V 40/18; G06V 40/45; G06V 20/90
See application file for complete search history.

(56) References Cited

U.S. PATENT DOCUMENTS

2010/0201810 A1* 8/2010 Shimazaki ............... B60R 1/00
348/135
2012/0300052 A1 11/2012 Hanna et al.
(Continued)

FOREIGN PATENT DOCUMENTS

JP 2018-504703 A 2/2018
JP 2019-506694 A 3/2019

OTHER PUBLICATIONS

Extended European Search Report for EP Application No. 20817727.9, dated on Jul. 1, 2022.
(Continued)

*Primary Examiner* — Syed Haider
(74) *Attorney, Agent, or Firm* — Sughrue Mion, PLLC

(57) ABSTRACT

The example embodiments provides a processing system including an extraction unit that extracts a feature amount of light reflected by a cornea of a person from an image generated by a first imaging apparatus, a comparison unit that specifies an imaging apparatus corresponding to the extracted feature amount of the light based on the extracted feature amount of the light and a reference feature amount indicating a feature of light emitted by each of a plurality of imaging apparatuses at a time of imaging, and a biometric detection unit that performs biometric detection based on a result of whether or not the first imaging apparatus matches the specified imaging apparatus.

9 Claims, 12 Drawing Sheets

(56) References Cited

U.S. PATENT DOCUMENTS

| | | | | |
|---|---|---|---|---|
| 2013/0088583 A1* | 4/2013 | Northcott | ............... | G06V 40/19 |
| | | | | 348/78 |
| 2015/0040212 A1* | 2/2015 | Kim | ....................... | A61B 5/002 |
| | | | | 726/19 |
| 2016/0188958 A1 | 6/2016 | Martin et al. | | |
| 2016/0196475 A1 | 7/2016 | Martin | | |
| 2016/0205096 A1* | 7/2016 | Hoyos | ..................... | H04L 63/10 |
| | | | | 705/72 |
| 2017/0123526 A1 | 5/2017 | Trail et al. | | |
| 2017/0323167 A1 | 11/2017 | Mapen et al. | | |
| 2018/0173980 A1* | 6/2018 | Fan | ....................... | G06V 40/45 |
| 2018/0349721 A1 | 12/2018 | Agrawal et al. | | |
| 2019/0213311 A1* | 7/2019 | Tussy | .................... | G06V 10/17 |

OTHER PUBLICATIONS

International Search Report for PCT Application No. PCT/JP2020/016266, mailed on Jul. 7, 2020.

Argentina Office Action for AR Application No. 20200101507 mailed on Mar. 14, 2024 with English Translation.

\* cited by examiner

FIG. 5

| IMAGING APPARATUS IDENTIFICATION INFORMATION | REFERENCE FEATURE AMOUNT |
|---|---|
| C0001 | * * * |
| ⋮ | ⋮ |

FIG. 8

|  | LIGHT EMISSION TYPE |  |
|---|---|---|
| C0001 | 001 | * * * |
|  | 002 | * * * |
|  | ⋮ | ⋮ |
| ⋮ | ⋮ | ⋮ |

PROCESSING SYSTEM, PROCESSING METHOD, AND NON-TRANSITORY STORAGE MEDIUM

This application is a National Stage Entry of PCT/JP2020/016266 filed on Apr. 13, 2020, which claims priority from Japanese Patent Application 2019-105904 filed on Jun. 6, 2019, the contents of all of which are incorporated herein by reference, in their entirety.

TECHNICAL FIELD

The example embodiments relates to a processing system, a processing method, and a program.

BACKGROUND ART

In biometric authentication using an iris image, a face image, or the like, biometric detection technology may be used. Patent Document 1 discloses a technology for performing biometric detection based on a change in corneal reflex accompanied by movement of a camera. In addition, Patent Document 1 discloses that the biometric detection may also be performed based on the corneal reflex that is changed by changing the color or a pattern of illumination.

RELATED DOCUMENT

Patent Document

[Patent Document 1] Japanese Patent Application Publication No. 2018-504703

DISCLOSURE OF INVENTION

Technical Problem

In the case of the technology disclosed in Patent Document 1 for performing the biometric detection based on a change in corneal reflex, a plurality of images are required, and the biometric detection cannot be performed based on one image. An object of the example embodiments is to provide a technology enabling biometric detection based on one image.

Solution to Problem

In one example embodiment, there is provided a processing system including an extraction unit that extracts a feature amount of light reflected by a cornea of a person from an image generated by a first imaging apparatus, a comparison unit that specifies an imaging apparatus corresponding to the extracted feature amount of the light based on the extracted feature amount of the light and a reference feature amount indicating a feature of light emitted by each of a plurality of imaging apparatuses at a time of imaging, and a biometric detection unit that performs biometric detection based on a result of whether or not the first imaging apparatus matches the specified imaging apparatus.

In another example embodiment, there is provided a processing system including an extraction unit that extracts a feature amount of light reflected by a cornea of a person from an image generated by a first imaging apparatus, a comparison unit that compares the extracted feature amount of the light with a reference feature amount indicating a feature of light emitted by the first imaging apparatus at a time of imaging, and a biometric detection unit that performs biometric detection based on a result of whether or not the extracted feature amount of the light matches the reference feature amount.

In another example embodiment, there is provided a processing method executed by a computer, the method including extracting a feature amount of light reflected by a cornea of a person from an image generated by a first imaging apparatus, specifying an imaging apparatus corresponding to the extracted feature amount of the light based on the extracted feature amount of the light and a reference feature amount indicating a feature of light emitted by each of a plurality of imaging apparatuses at a time of imaging, and performing biometric detection based on a result of whether or not the first imaging apparatus matches the specified imaging apparatus.

In another example embodiment, there is provided a processing method executed by a computer, the method including extracting a feature amount of light reflected by a cornea of a person from an image generated by a first imaging apparatus, comparing the extracted feature amount of the light with a reference feature amount indicating a feature of light emitted by the first imaging apparatus at a time of imaging, and performing biometric detection based on a result of whether or not the extracted feature amount of the light matches the reference feature amount.

In another example embodiment, there is provided a program causing a computer to function as an extraction unit that extracts a feature amount of light reflected by a cornea of a person from an image generated by a first imaging apparatus, a comparison unit that specifies an imaging apparatus corresponding to the extracted feature amount of the light based on the extracted feature amount of the light and a reference feature amount indicating a feature of light emitted by each of a plurality of imaging apparatuses at a time of imaging, and a biometric detection unit that performs biometric detection based on a result of whether or not the first imaging apparatus matches the specified imaging apparatus.

In another example embodiment, there is provided a program causing a computer to function as an extraction unit that extracts a feature amount of light reflected by a cornea of a person from an image generated by a first imaging apparatus, a comparison unit that compares the extracted feature amount of the light with a reference feature amount indicating a feature of light emitted by the first imaging apparatus at a time of imaging, and a biometric detection unit that performs biometric detection based on a result of whether or not the extracted feature amount of the light matches the reference feature amount.

BRIEF DESCRIPTION OF THE DRAWINGS

FIG. 5 is a diagram schematically illustrating one example of information processed by the processing system of the present example embodiment.

FIG. 8 is a diagram schematically illustrating one example of the information processed by the processing system of the present example embodiment.

EXAMPLE EMBODIMENT

First Example Embodiment

Figure 1:
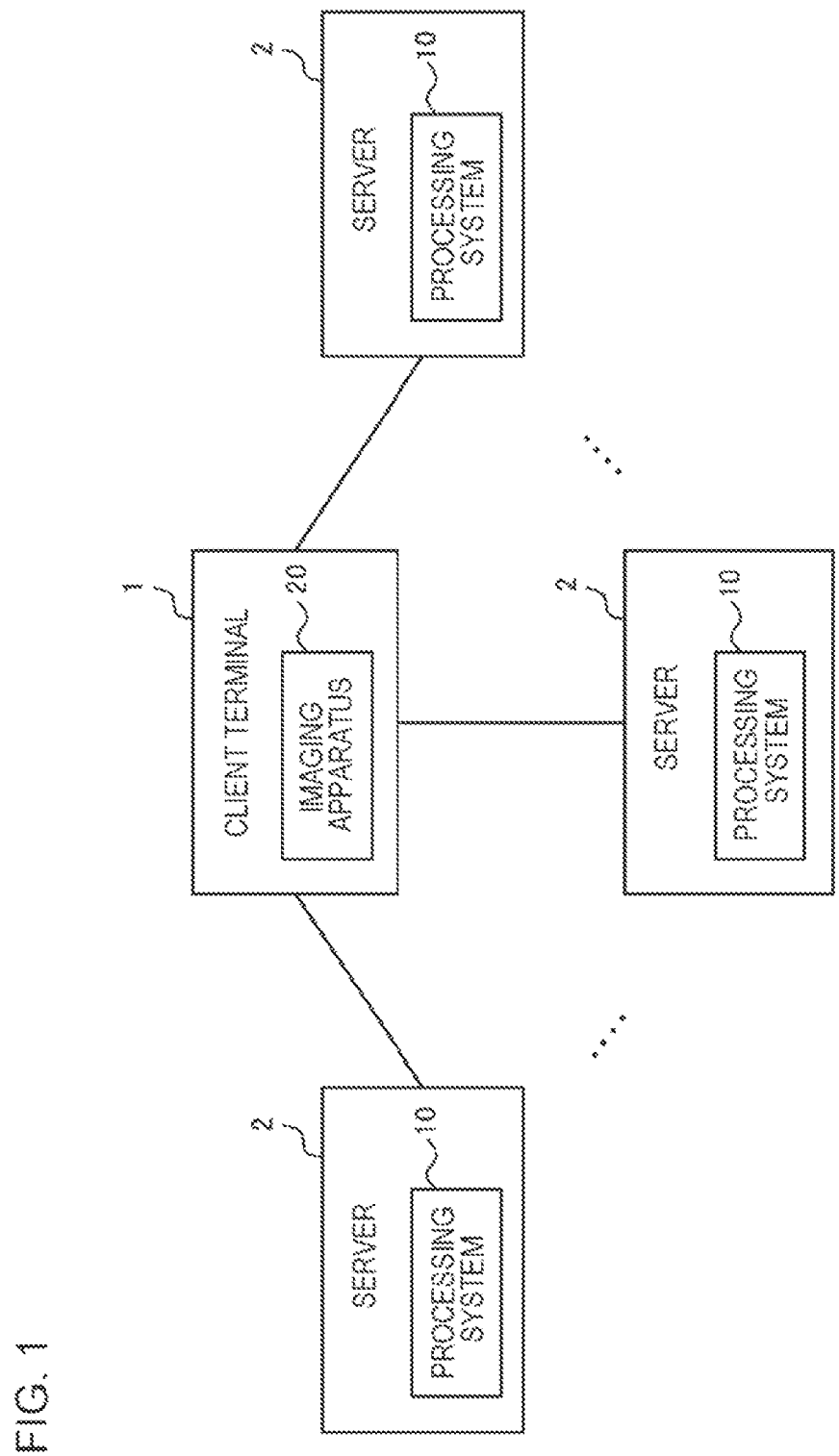
FIG. 1 is a function block diagram for describing one example of a relationship between an imaging apparatus and a processing system of the present example embodiment.

First, an overall perspective and a summary of the present example embodiment will be described using FIG. 1. As illustrated, the present example embodiment employs a server-client system. A server 1 performs biometric authentication based on an iris image or a face image acquired from a client terminal 2 and biometric detection based on an image of a cornea part (hereinafter, a "cornea image"). For the client terminal 2 that succeeds in passing the biometric authentication and for which it is determined that the image is obtained from a living body, the server 1 permits the client terminal 2 to perform a predetermined process. The predetermined process is logging in to the server 1 or the like but is not limited thereto.

The biometric authentication of the present example embodiment is implemented by employing any technology.

A summary of the biometric detection of the present example embodiment is as follows. First, imaging apparatuses 10 respectively disposed in a plurality of client terminals 2 include imaging apparatuses 10 having different makers, model numbers, versions, or the like. The plurality of imaging apparatuses 10 may include imaging apparatuses 10 having an identical maker, model number, version, or the like. The imaging apparatuses 10 having different makers, model numbers, versions, or the like may have different characteristics of light emitted at the time of imaging due to a difference in the number of light sources, a method of arranging a plurality of light sources, a positional relationship between a lens and a light source, a method of light emission by the plurality of light sources, or the like. Consequently, characteristics (example: a pattern of light or a position in a pupil) of reflected light that is reflected in the cornea of a person included in the image may be different. Light emitted by a light source of the imaging apparatus 10 is desirably infrared light but may be other light.

In a case where the living body is imaged by the imaging apparatus 10, the characteristics of the light reflected by the cornea of the person included in the generated image originate from the imaging apparatus 10. Meanwhile, in a case where a non-living body, for example, an image (printed matter) generated by another imaging apparatus 10, is imaged by the imaging apparatus 10, the characteristics of light reflected by the cornea of the person included in the generated image originate from the other imaging apparatus 10.

The processing system 20 of the present example embodiment performs the biometric detection based on such characteristics. Specifically, in a case where the processing system 20 extracts a feature amount of the light reflected by the cornea of the person from the image generated by a first imaging apparatus 10, the processing system 20 compares the extracted feature amount of the light with a reference feature amount indicating characteristics of the light emitted by each of the plurality of imaging apparatuses 10 at the time of imaging, and specifies the imaging apparatus 10 corresponding to the extracted feature amount of the light. In a case where the first imaging apparatus 10 matches the specified imaging apparatus 10, the processing system 20 determines that the image is obtained from the living body. In the case of non-matching, the processing system 20 determines that the image is not obtained from the living body.

Next, a configuration of the processing system 20 of the present example embodiment will be described in detail. First, one example of a hardware configuration of the processing system 20 will be described. Each function of the processing system 20 is implemented by any combination of hardware and software mainly based on a central processing unit (CPU) of any computer, a memory, a program loaded in the memory, a storage unit (can store not only a program stored in advance from a step of shipping the apparatus but also a program downloaded from a storage medium such as a compact disc (CD) or a server or the like on the Internet) such as a hard disk storing the program, and an interface for network connection. Those skilled in the art may understand that various modification examples are present for the implementation method and the apparatus.

Figure 2:
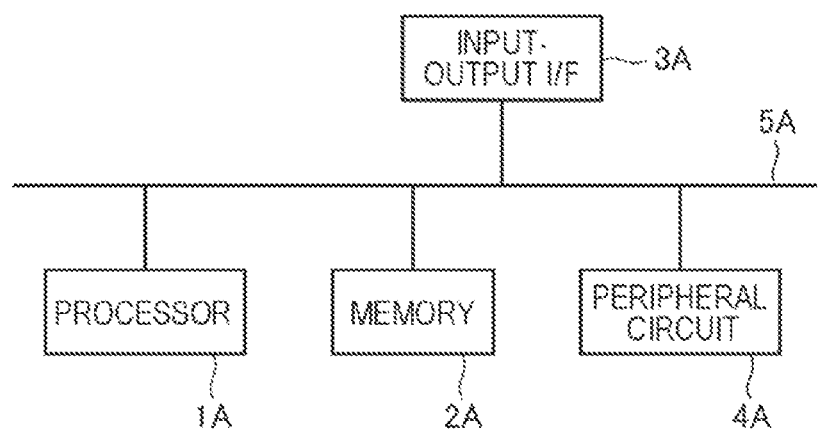
FIG. 2 is a diagram illustrating one example of a hardware configuration of the processing system of the present example embodiment.

FIG. 2 is a block diagram illustrating a hardware configuration of the processing system 20. As illustrated in FIG. 2, the processing system 20 includes a processor 1A, a memory 2A, an input-output interface 3A, a peripheral circuit 4A, and a bus 5A. The peripheral circuit 4A includes various modules. The peripheral circuit 4A may not be included. The processing system 20 may be configured with one physically and/or logically integrated apparatus or may be configured with a plurality of physically and/or logically separated apparatuses. In a case where the processing system 20 is configured with the plurality of physically and/or logically separated apparatuses, each of the plurality of apparatuses can have the hardware configuration.

The bus 5A is a data transfer path for transmitting and receiving data among the processor 1A, the memory 2A, the peripheral circuit 4A, and the input-output interface 3A. The processor 1A is an operation processing device such as a CPU or a graphics processing unit (GPU). The memory 2A is a memory such as a random access memory (RAM) or a read only memory (ROM). The input-output interface 3A includes an interface for acquiring information from an input device, an external apparatus, an external server, an external sensor, a camera, or the like and an interface for outputting information to an output device, the external apparatus, the external server, or the like. The input device is, for example, a keyboard, a mouse, a microphone, a touch panel, a physical button, or a camera. The output device is, for example, a display, a speaker, a printer, or a mailer. The processor 1A can output an instruction to each module and perform operations based on the operation results of the modules.

Figure 3:
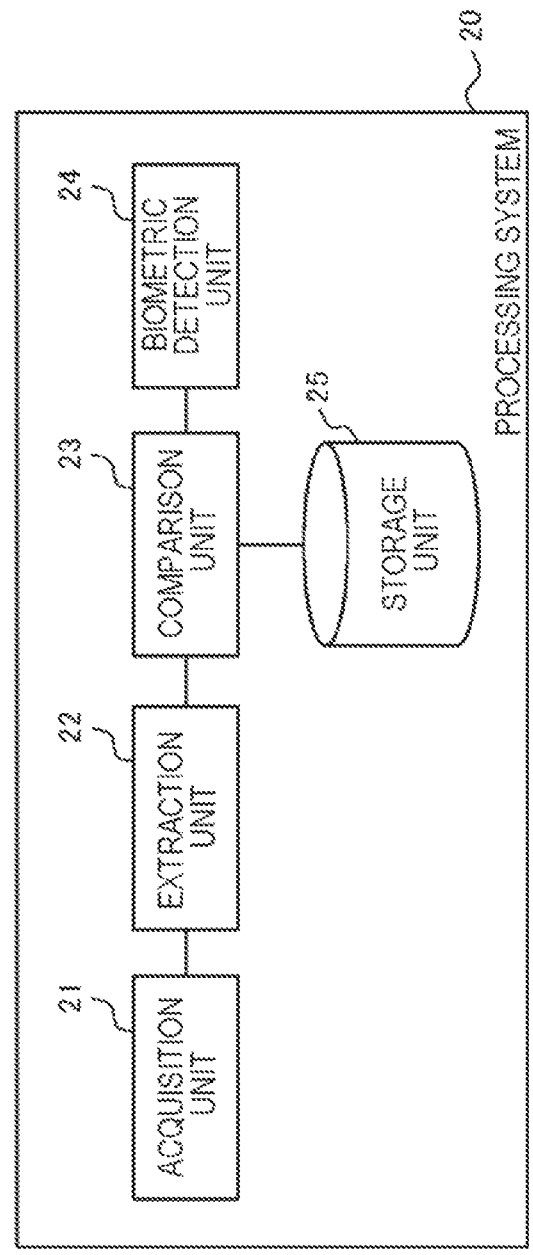
FIG. 3 is one example of a function block diagram of the processing system of the present example embodiment.

Next, one example of a functional configuration of the processing system 20 will be described. FIG. 3 illustrates one example of a function block diagram of the processing system 20. As illustrated, the processing system 20 includes an acquisition unit 21, an extraction unit 22, a comparison unit 23, a biometric detection unit 24, and a storage unit 25. The processing system 20 may not include the storage unit 25. In this case, an external apparatus that is configured to be capable of communicating with the processing system 20 includes the storage unit 25.

The storage unit 25 stores the reference feature amount indicating the feature of the light emitted by each of the plurality of imaging apparatuses 10 at the time of imaging.

Figure 4:
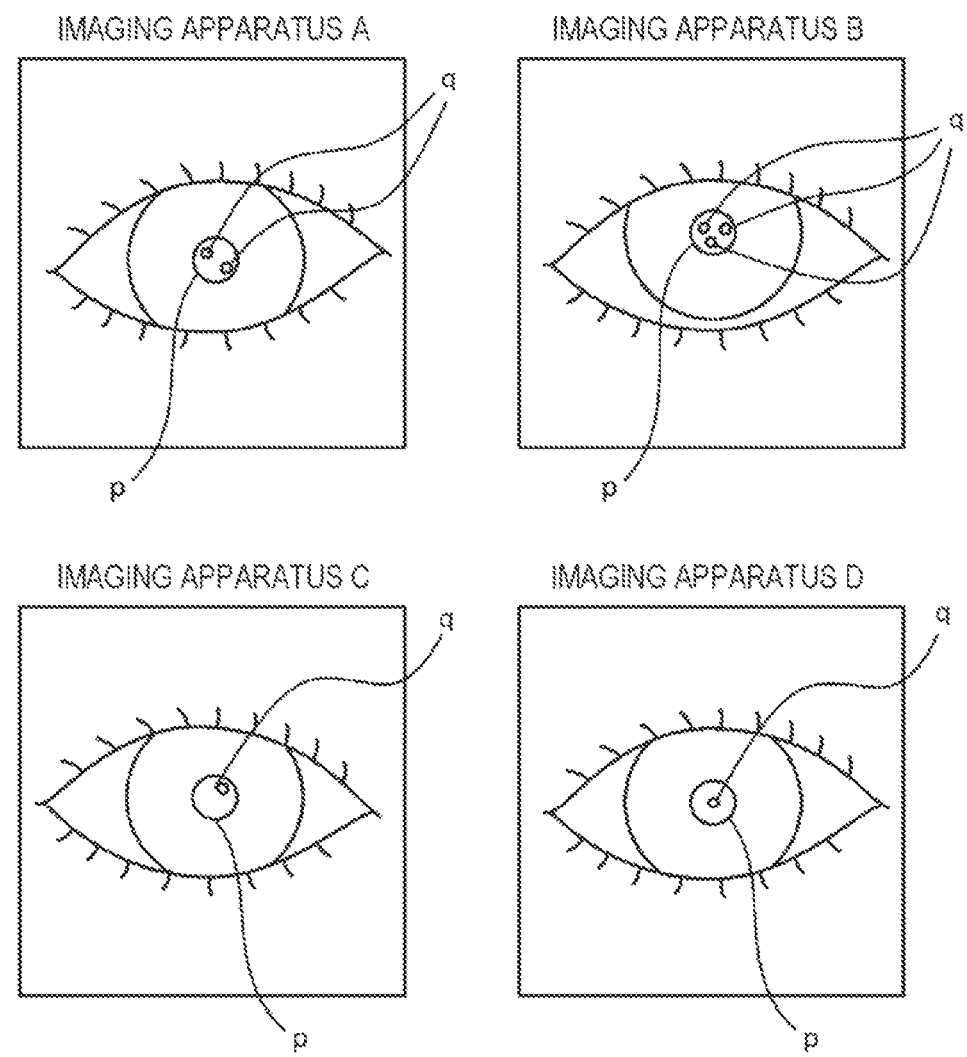
FIG. 4 is a diagram for describing an effect of the processing system of the present example embodiment.

As described above, the plurality of imaging apparatuses 10 include the imaging apparatuses 10 having different makers, model numbers, versions, or the like. The imaging apparatuses 10 having different makers, model numbers, versions, or the like may have different characteristics of the light emitted at the time of imaging due to a difference in the number of light sources, the method of arranging the plurality of light sources, the positional relationship between the lens and the light source, the manner of light emission by the plurality of light sources, or the like. Consequently, the characteristics (example: a pattern of light or a position in a pupil) of the reflected light that is reflected in the cornea of the person included in the image may be different. For example, as illustrated in FIG. 4, the pattern of reflected light q superimposed on a pupil p in the image, the position of the reflected light q in the pupil p, or the like may be different for each imaging apparatus 10.

The reference feature amount can indicate at least one of the pattern of the reflected light q superimposed on the pupil p in the image and the position of the reflected light q in the pupil p in the image. In addition, the reference feature amount may indicate the feature of the reflected light q in each of a right eye and a left eye in the image. The feature (the position in the pupil or the like) of the reflected light may be different between the right eye and the left eye.

FIG. 5 schematically illustrates one example of information stored in the storage unit 25. In the illustrated example, imaging apparatus identification information and the reference feature amount are associated with each other.

Returning to FIG. 3, the acquisition unit 21 acquires the image generated by each of the plurality of imaging apparatuses 10 and information (imaging apparatus identification information) for identifying the imaging apparatus 10 generating each image. For example, the client terminal 2 (refer to FIG. 1) transmits the image generated by the imaging apparatus 10 corresponding to the own terminal and the imaging apparatus identification information to the server 1. The acquisition unit 21 acquires the image and the imaging apparatus identification information transmitted from the client terminal 2.

In the present specification, "acquisition" includes at least one of "the own apparatus acquiring data stored in another apparatus or a storage medium (active acquisition)" based on a user input or an instruction of a program, for example, reception by making a request or an inquiry to the other apparatus or accessing the other apparatus or the storage medium and reading, and "the own apparatus inputting data output from the other apparatus into the own apparatus (passive acquisition)" based on the user input or the instruction of the program, for example, waiting in a state where data transmitted from the external apparatus can be received, receiving data transmitted from the external apparatus, receiving data distributed (or transmitted, push-notified, or the like) from the external apparatus, or selective acquisition from the received data or information, and "generating new data by editing data (converting the data into a text, rearranging the data, extracting a part of the data, changing a file format, or the like) and acquiring the new data".

The extraction unit 22 extracts the feature amount of the light reflected by the cornea of the person from the image generated by the imaging apparatus 10. For example, the extraction unit 22 detects the face of the person included in the image, the eye of the person, the pupil of the person, and the reflected light in the pupil using any image analysis technology such as template matching or edge detection technology. The extraction unit 22 specifies at least one of the pattern of the reflected light superimposed on the pupil and the position of the reflected light in the pupil based on a detection result.

The comparison unit 23 specifies the imaging apparatus 10 corresponding to the feature amount of the light extracted by the extraction unit 22 based on the feature amount of the light extracted by the extraction unit 22 and the reference feature amount of each of the plurality of imaging apparatuses 10 stored in the storage unit 25.

For example, the comparison unit 23 may compare the feature amount of the light extracted by the extraction unit 22 with the reference feature amount of each of the plurality of imaging apparatuses 10 stored in the storage unit 25 and specify the reference feature amount matching (having similarity greater than or equal to a predetermined level) the feature amount of the light extracted by the extraction unit 22. The comparison unit 23 may specify the imaging apparatus 10 corresponding to the specified reference feature amount as the imaging apparatus corresponding to the feature amount of the light extracted by the extraction unit 22.

Besides, an inference model for inferring the imaging apparatus 10 generating the face image of the person from the feature amount of the light reflected by the cornea of the person may be generated using machine learning based on training data in which each of the plurality of imaging apparatuses 10 is associated with the face image (or the reference feature amount of each imaging apparatus 10) of the person generated by the imaging apparatus 10. The comparison unit 23 may obtain an inference result of the imaging apparatus 10 corresponding to the feature amount of the light based on the inference model and the feature amount of the light extracted by the extraction unit 22. The "face image" used in the biometric detection in the present application may be an image including the eye of the person and does not necessarily include the entire face of the person.

Figure 6:
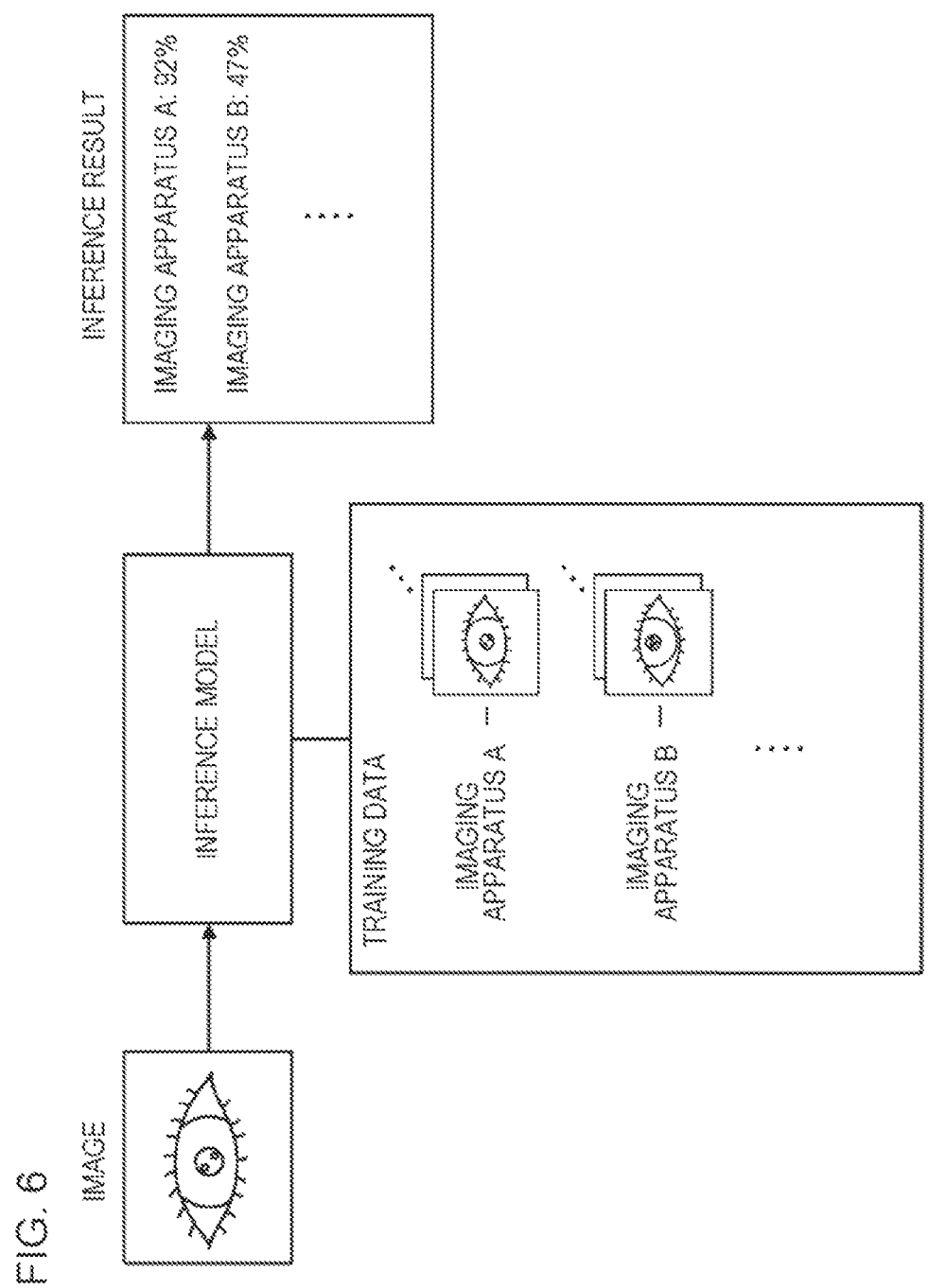
FIG. 6 is a diagram for describing one example of a process of the processing system of the present example embodiment.

FIG. 6 illustrates a summary of the above process. As illustrated, a degree of certainty that the image is generated by each imaging apparatus 10 may be shown in the inference result of the inference model. The comparison unit 23 may specify the imaging apparatus 10 of which the degree of certainty satisfies a predetermined condition (example: the maximum value and greater than or equal to a threshold) as the imaging apparatus 10 corresponding to the feature amount of the light extracted by the extraction unit 22.

Returning to FIG. 3, the biometric detection unit 24 performs the biometric detection based on a result of whether or not the imaging apparatus 10 generating the image acquired by the acquisition unit 21 matches the imaging apparatus 10 specified by the comparison unit 23.

Specifically, in a case where the imaging apparatus 10 generating the image acquired by the acquisition unit 21 matches the imaging apparatus 10 specified by the comparison unit 23, the biometric detection unit 24 determines that the image acquired by the acquisition unit 21 is the image obtained from the living body. The image obtained from the living body means an image that is generated by imaging the living body by the imaging apparatus 10.

Meanwhile, in a case where the imaging apparatus 10 generating the image acquired by the acquisition unit 21 does not match the imaging apparatus 10 specified by the comparison unit 23, the biometric detection unit 24 determines that the image acquired by the acquisition unit 21 is not the image obtained from the living body. The image not obtained from the living body is, for example, an image generated by imaging a printed matter by the imaging apparatus 10.

Figure 7:
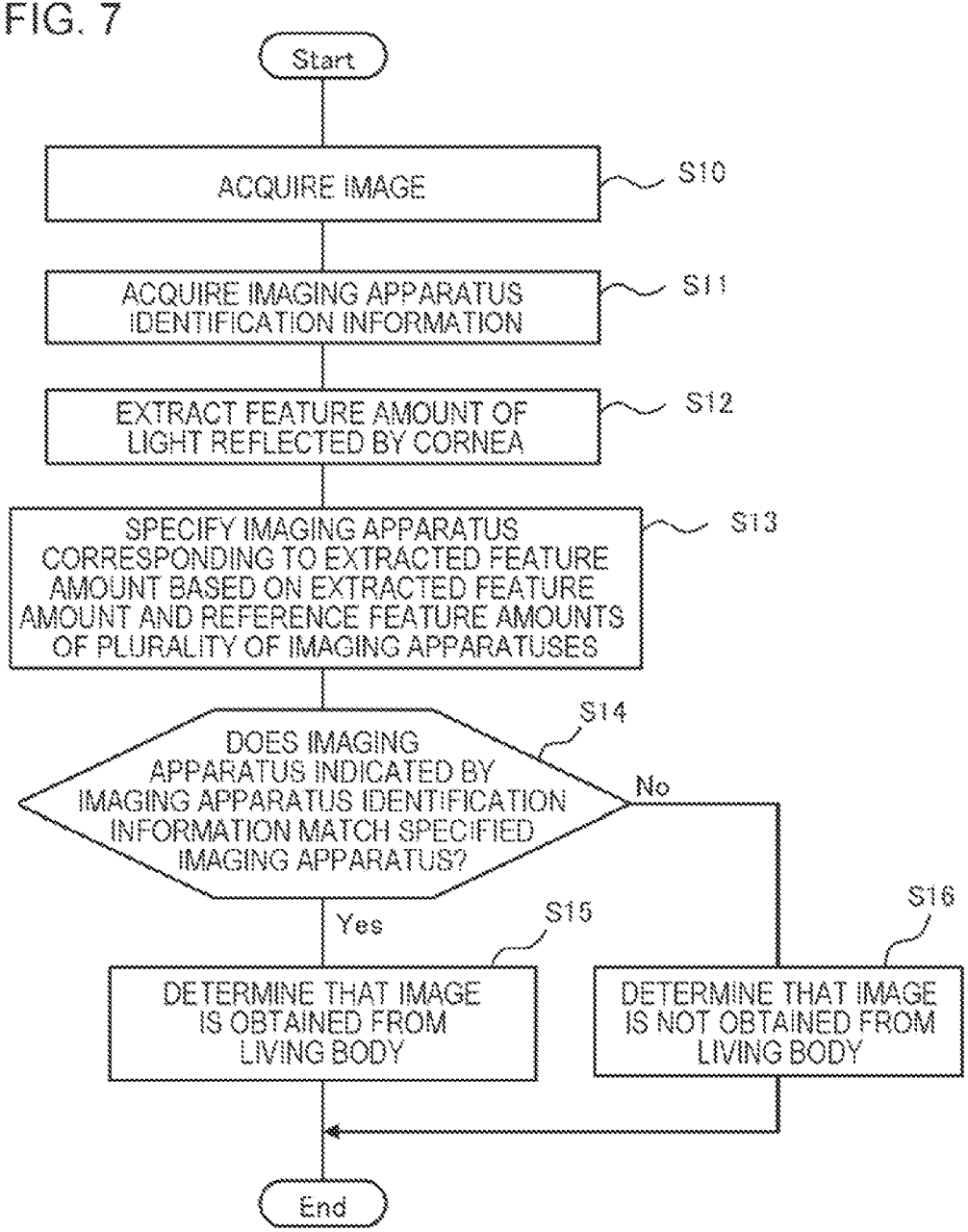
FIG. 7 is a flowchart illustrating one example of a flow of process of the processing system of the present example embodiment.

Next, one example of a flow of process of the processing system 20 will be described using the flowchart in FIG. 7. Details of the process performed by each function unit are described above and thus, will not be repeated here.

First, the acquisition unit 21 acquires the image and the imaging apparatus identification information (S10 and S11). The extraction unit 22 extracts the feature amount of the light reflected by the cornea of the person from the image acquired in S10 (S12).

Next, the comparison unit 23 specifies the imaging apparatus 10 corresponding to the feature amount of the light extracted in S12 based on the feature amount of the light extracted in S12 and the reference feature amount of each of the plurality of imaging apparatuses 10 stored in the storage unit 25 (S13).

In a case where the imaging apparatus 10 specified in S13 matches the imaging apparatus 10 indicated by the imaging apparatus identification information acquired in S11 (Yes in S14), the biometric detection unit 24 determines that the image acquired in S10 is the image obtained from the living body (S15). Meanwhile, in a case where the imaging apparatus 10 specified in S13 does not match the imaging apparatus 10 indicated by the imaging apparatus identification information acquired in S11 (No in S14), the biometric detection unit 24 determines that the image acquired in S10 is not the image obtained from the living body (S16).

According to the imaging apparatus 10 and the processing system 20 of the present example embodiment, a technology enabling biometric detection based on one image is achieved. In addition, since the biometric detection can be performed based on one image, an increase in processing burden of a computer caused by analyzing a plurality of images can be reduced. In addition, a camera of which the color or the pattern of illumination changes and that is necessary in the case of performing the biometric detection based on a change in corneal reflex does not need to be prepared. Thus, an increase in cost burden can be reduced.

Second Example Embodiment

In the present example embodiment, the plurality of imaging apparatuses 10 randomly or regularly change the light emitted at the time of imaging. For example, one light source emits light at a certain timing, and a plurality of light sources emit light at another timing.

The processing system 20 acquires light emission type information indicating the type of light emitted by each of the plurality of imaging apparatuses 10 at the time of imaging the person and specifies the imaging apparatus 10 corresponding to the extracted feature amount of the light based on the light emission type information. Hereinafter, details will be described.

One example of a function block diagram of the processing system 20 of the present example embodiment is illustrated in FIG. 3.

Figure 8:
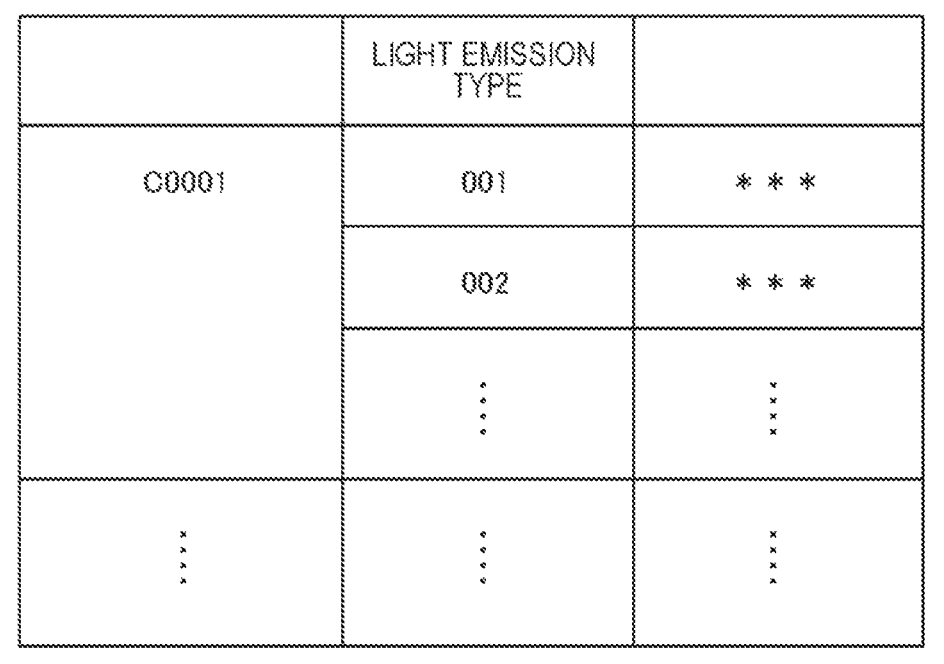

The storage unit 25 stores the reference feature amount indicating the feature of the light emitted by each of the plurality of imaging apparatuses 10 at the time of imaging. FIG. 8 schematically illustrates one example of information stored in the storage unit 25. In the illustrated example, the imaging apparatus identification information, a light emission type, and the reference feature amount are associated with each other. As illustrated, the storage unit 25 stores variations of a plurality of reference feature amounts of each imaging apparatus 10 in association with the imaging apparatus 10.

The comparison unit 23 acquires the light emission type information indicating the type of light emitted by each of the plurality of imaging apparatuses 10 at the time of imaging the person. The comparison unit 23 may acquire the light emission type information from the imaging apparatus 10 or may calculate the light emission type information based on a predetermined rule.

For example, the imaging apparatus 10 switches the type of emitted light (hereinafter, may be referred to as the "light emission type") at a predetermined timing or a random timing. Each time the imaging apparatus 10 switches the light emission type, the imaging apparatus 10 notifies the processing system 20 of a new light emission type. The comparison unit 23 manages the most recent light emission type of each of the plurality of imaging apparatuses 10 based on the notification from the imaging apparatus 10.

The predetermined timing may be every certain time such as every 5 minutes, every 30 minutes, every hour, or every day. Different light emission types have different methods of light emission by the light source. For example, one light source emits light for a certain light emission type, and a plurality of light sources emit light for another light emission type. Various methods of switching the light emission type are present. For example, the imaging apparatus 10 may switch a plurality of light emission types in a predetermined order or may randomly decide a new one from the plurality of light emission types.

Besides, the imaging apparatus 10 may decide the type of light emitted at each imaging timing based on any key and a predetermined calculation rule. For example, any number (example: month, date, time, or minute) included in the date and time of the imaging timing may be set as the key. The comparison unit 23 may prestore the calculation rule of each imaging apparatus 10 and calculate the type of light emitted by each of the imaging apparatus 10 at each timing based on the calculation rule and the key acquired by the own system.

A method of acquiring the light emission type information by the comparison unit 23 is not limited to the above example, and other methods may be employed.

The comparison unit 23 specifies the imaging apparatus 10 corresponding to the feature amount of the light extracted by the extraction unit 22 based on the acquired light emission type information.

For example, the comparison unit 23 may compare the feature amount of the light extracted by the extraction unit 22 with the reference feature amount (specified based on the light emission type information) indicating the feature of the light emitted by each of the plurality of imaging apparatuses 10 at the time when the image acquired by the acquisition unit 21 is captured, and specify the reference feature amount matching the feature amount of the light extracted by the extraction unit 22. The comparison unit 23 may specify the imaging apparatus corresponding to the specified reference feature amount as the imaging apparatus 10 corresponding to the feature amount of the light extracted by the extraction unit 22.

Besides, an inference model for inferring the imaging apparatus 10 generating the face image of the person from the feature amount of the light reflected by the cornea of the person may be generated using machine learning based on training data in which each of the plurality of imaging apparatuses 10 is associated with the reference feature amount (or the image generated at the time of emitting the light) indicating the feature of the light emitted by each of the plurality of imaging apparatuses 10 at the time of capturing the image acquired by the acquisition unit 21.

The comparison unit 23 may obtain an inference result of the imaging apparatus 10 corresponding to the feature amount of the light based on the inference model and the feature amount of the light extracted by the extraction unit 22.

Other configurations of the imaging apparatus 10 and the processing system 20 are the same as the first example embodiment.

According to the imaging apparatus 10 and the processing system 20 of the present example embodiment, the same effect as the first example embodiment is achieved. In addition, since the biometric detection described in the first example embodiment can be performed by randomly or regularly changing the light emitted by the imaging apparatus 10 at the time of imaging, fraudulent activities can be effectively excluded.

Third Example Embodiment

The processing system 20 of the present example embodiment is different from the first and second example embodiments in that the biometric detection is performed based on whether or not the feature amount of the light extracted from the image generated by the first imaging apparatus 10 matches the reference feature amount indicating the feature of the light emitted by the first imaging apparatus 10 at the time of imaging.

One example of a function block diagram of the processing system 20 of the present example embodiment is illustrated in FIG. 3.

The comparison unit 23 compares the feature amount of the light extracted by the extraction unit 22 with the reference feature amount indicating the feature of the light emitted by the imaging apparatus 10 which is indicated by the imaging apparatus identification information acquired by the acquisition unit 21 at the time of imaging.

The biometric detection unit 24 performs the biometric detection based on a result of whether or not the feature amount of the light extracted by the extraction unit 22 matches the reference feature amount.

Specifically, in a case where the feature amount of the light extracted by the extraction unit 22 matches the reference feature amount, the biometric detection unit 24 determines that the image acquired by the acquisition unit 21 is the image obtained from the living body. Meanwhile, in a case where the feature amount of the light extracted by the extraction unit 22 does not match the reference feature amount, the biometric detection unit 24 determines that the image acquired by the acquisition unit 21 is not the image obtained from the living body.

Next, one example of a flow of process of the processing system 20 will be described using the flowchart in FIG. 9. Details of the process performed by each function unit are described above and thus, will not be repeated here.

First, the acquisition unit 21 acquires the image and the imaging apparatus identification information (S20 and S21). The comparison unit 23 retrieves the reference feature amount corresponding to the imaging apparatus identification information acquired in S21 from the storage unit 25 (refer to FIG. 5) (S22). The extraction unit 22 extracts the feature amount of the light reflected by the cornea of the person from the image acquired in S20 (S23). The processing order of S22 and S23 is not limited to the illustrated example.

Next, the comparison unit 23 compares the feature amount of the light extracted in S23 with the reference feature amount acquired in S22 (S24).

In a case where the feature amount of the light extracted in S23 matches the reference feature amount acquired in S22 (Yes in S25), the biometric detection unit 24 determines that the image acquired in S20 is the image obtained from the living body (S26). Meanwhile, in a case where the feature amount of the light extracted in S23 does not match the reference feature amount acquired in S22 (No in S25), the biometric detection unit 24 determines that the image acquired in S20 is not the image obtained from the living body (S27).

Other configurations of the imaging apparatus 10 and the processing system 20 are the same as the first example embodiment.

According to the imaging apparatus 10 and the processing system 20 of the present example embodiment, the same effect as the first example embodiment is achieved. In addition, since the same effect as the first example embodiment is achieved by a different process from the first example embodiment, the range of design is increased, and such an increase is preferable.

Fourth Example Embodiment

In the present example embodiment, the plurality of imaging apparatuses 10 randomly or regularly change the light emitted at the time of imaging. For example, one light source emits light at a certain timing, and a plurality of light sources emit light at another timing.

The processing system 20 acquires the light emission type information indicating the type of light which is emitted by the imaging apparatus 10 generating the image when the acquired image is generated, and performs a comparison process using the reference feature amount indicating the feature of the light indicated by the light emission type information. Hereinafter, details will be described.

One example of a function block diagram of the processing system 20 of the present example embodiment is illustrated in FIG. 3.

The storage unit 25 stores the reference feature amount indicating the feature of the light emitted by each of the plurality of imaging apparatuses 10 at the time of imaging. FIG. 8 schematically illustrates one example of information stored in the storage unit 25. In the illustrated example, the imaging apparatus identification information, the light emission type, and the reference feature amount are associated with each other. As illustrated, the storage unit stores variations of a plurality of reference feature amounts of each imaging apparatus 10 in association with the imaging apparatus 10.

The comparison unit 23 acquires the light emission type information indicating the type of light which is emitted by the imaging apparatus 10 generating the image when (at the time of imaging) the image acquired by the acquisition unit 21 is generated. A method of acquiring the light emission type information by the comparison unit 23 is the same as described in the second example embodiment.

The comparison unit 23 compares the feature amount of the light extracted by the extraction unit 22 with the reference feature amount indicating the feature of the light indicated by the acquired light emission type information.

Next, one example of a flow of process of the processing system 20 will be described using the flowchart in FIG. 10. Details of the process performed by each function unit are described above and thus, will not be repeated here.

First, the acquisition unit 21 acquires the image and the imaging apparatus identification information (S30 and S31). Next, the comparison unit 23 acquires the light emission type information indicating the type of light emitted by the imaging apparatus 10 at the time of generating the image acquired in S30 (S32). The comparison unit 23 retrieves the imaging apparatus identification information acquired in S31 and the reference feature amount corresponding to the light emission type information acquired in S32 from the storage unit 25 (refer to FIG. 8) (S33). The extraction unit 22 extracts the feature amount of the light reflected by the cornea of the person from the image acquired in S30 (S34). The processing order of S32, S33, and S34 is not limited to the illustrated example.

Next, the comparison unit 23 compares the feature amount of the light extracted in S34 with the reference feature amount acquired in S33 (S35).

In a case where the feature amount of the light extracted in S34 matches the reference feature amount acquired in S33 (Yes in S36), the biometric detection unit 24 determines that the image acquired in S30 is the image obtained from the living body (S37). Meanwhile, in a case where the feature amount of the light extracted in S34 does not match the reference feature amount acquired in S33 (No in S36), the biometric detection unit 24 determines that the image acquired in S30 is not the image obtained from the living body (S38).

Other configurations of the imaging apparatus 10 and the processing system 20 are the same as the third example embodiment.

According to the imaging apparatus 10 and the processing system 20 of the present example embodiment, the same effect as the third example embodiment is achieved. In addition, since the biometric detection described in the third example embodiment can be performed by randomly or regularly changing the light emitted by the imaging apparatus 10 at the time of imaging, fraudulent activities can be effectively excluded.

Fifth Example Embodiment

In the present example embodiment, biometric detection in which the "biometric detection process of any of the first to fourth example embodiments" and a "biometric detection process based on a plurality of images generated by imaging the same person a plurality of times by changing the light emitted by the imaging apparatus 10" are combined is performed. Hereinafter, details will be described.

One example of a function block diagram of the processing system 20 of the present example embodiment is illustrated in FIG. 3.

In the present example embodiment, the imaging apparatus 10 images the same person a plurality of times by changing the emitted light and generates a plurality of images including the same person. For example, imaging is performed by causing one light source to emit light at a certain timing, and imaging is performed by causing another light source (or a plurality of light sources) to emit light at another timing.

The extraction unit 22 extracts the feature amount of the light reflected by the cornea of the person from each of the plurality of images.

The comparison unit 23 compares the feature amounts of the light extracted from the plurality of images including the same person with each other.

The biometric detection unit 24 performs the biometric detection based on the feature amount of the light extracted from each of the plurality of images including the same person. Specifically, the biometric detection unit 24 performs the biometric detection based on a result of whether or not the feature amounts of the light extracted from the plurality of images satisfy a predetermined relationship. The predetermined relationship is "the feature amounts of the light extracted from the plurality of images do not match each other", "a relative relationship between light emission positions indicated by the feature amounts of the light extracted from the plurality of images satisfies a predetermined relationship", or the like but is not limited thereto.

For example, in a case where imaging is performed by causing one light source to emit light at a certain timing and imaging is performed by causing another light source to emit light at another timing, the position of the reflected light in the pupil in the image generated at the certain timing is different from the position of the reflected light in the pupil in the image generated at the other timing on the assumption that a subject almost does not move between the two very short timings. The relative relationship can be calculated based on a relative positional relationship between two light sources, a relative positional relationship among the camera, the light source, and the subject, or the like.

Figure 11:
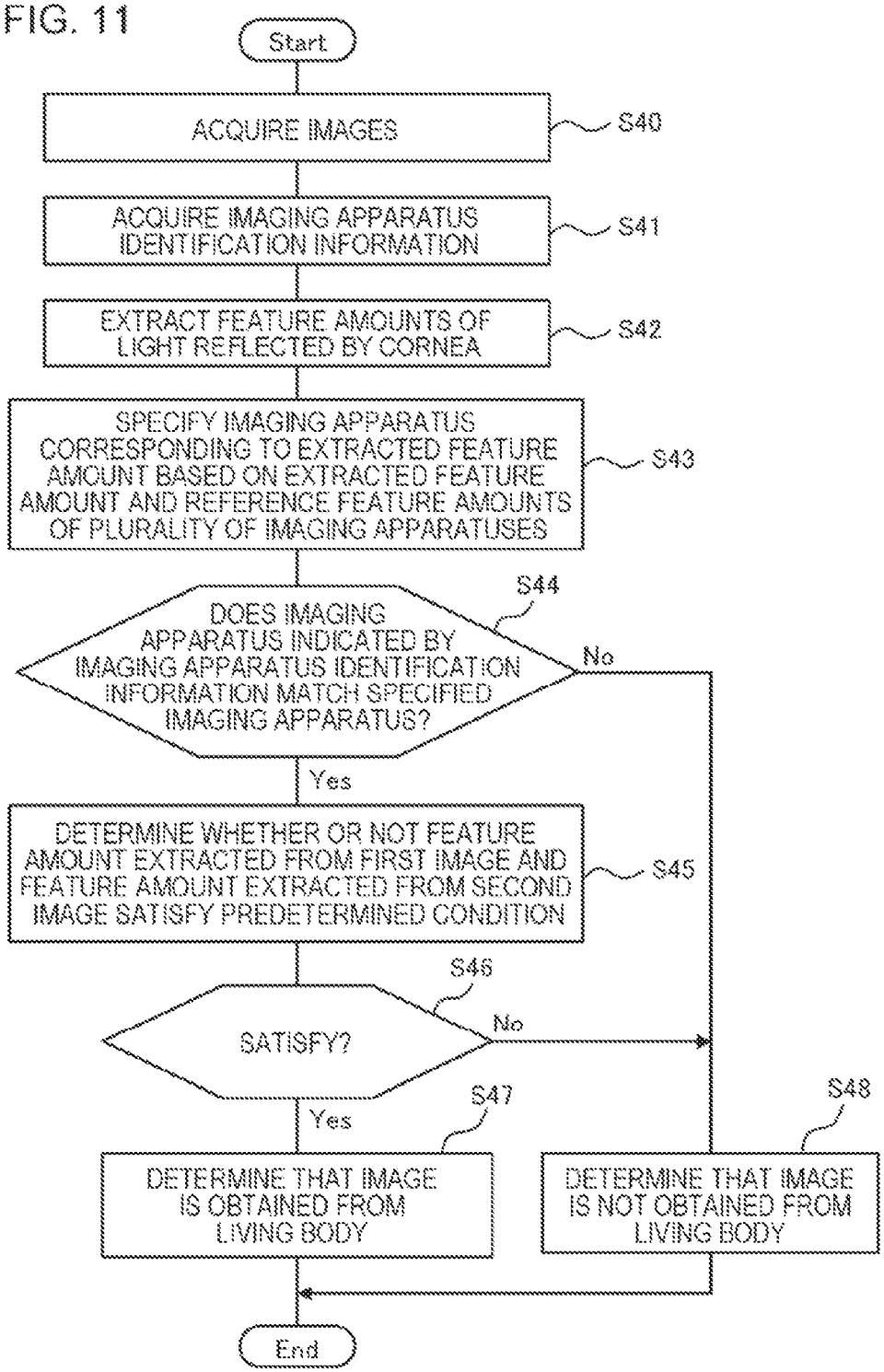
FIG. 11 is a flowchart illustrating one example of the flow of process of the processing system of the present example embodiment.

Next, one example of a flow of process of the processing system 20 will be described using the flowchart in FIG. 11. Details of the process performed by each function unit are described above and thus, will not be repeated here.

First, the acquisition unit 21 acquires the plurality of images and the imaging apparatus identification information (S40 and S41). Here, the acquisition unit 21 acquires an image captured at an earlier timing and an image captured at a later timing. The type of light emitted by the imaging apparatus 10 is different between the earlier imaging timing and the later imaging timing. The extraction unit 22 extracts the feature amount of the light reflected by the cornea of the person from each of the plurality of images acquired in S40 (S42).

Next, the comparison unit 23 specifies the imaging apparatus 10 corresponding to the feature amount of the light extracted in S42 based on the feature amount of the light extracted from the image captured at the earlier timing and the reference feature amount (reference feature amount indicating the feature of the light emitted at the time of imaging at the earlier timing) of each of the plurality of imaging apparatuses 10 stored in the storage unit 25 (S43). The type of light emitted at the earlier timing may be decided in advance for each imaging apparatus 10, and information about the type of light may be stored in the processing system 20. In this process, the "earlier timing" may be replaced with the "later timing".

In a case where the imaging apparatus 10 specified in S43 matches the imaging apparatus 10 indicated by the imaging apparatus identification information acquired in S41 (Yes in S44), the comparison unit 23 determines whether or not the feature amount of the light extracted from the image captured at the earlier timing and the feature amount of the light extracted from the image captured at the later timing satisfy the predetermined relationship (S45). The predetermined relationship is described above.

In a case where the feature amount of the light extracted from the image captured at the earlier timing and the feature amount of the light extracted from the image captured at the later timing satisfy the predetermined relationship (Yes in S46), the biometric detection unit 24 determines that the image acquired in S40 is the image obtained from the living body (S47).

Meanwhile, in a case where the imaging apparatus 10 specified in S43 does not match the imaging apparatus 10 indicated by the imaging apparatus identification information acquired in S41 (No in S44), and the feature amount of the light extracted from the image captured at the earlier timing and the feature amount of the light extracted from the image captured at the later timing do not satisfy the predetermined relationship (No in S46), the biometric detection unit 24 determines that the image acquired in S40 is not the image obtained from the living body (S48).

Figure 9:
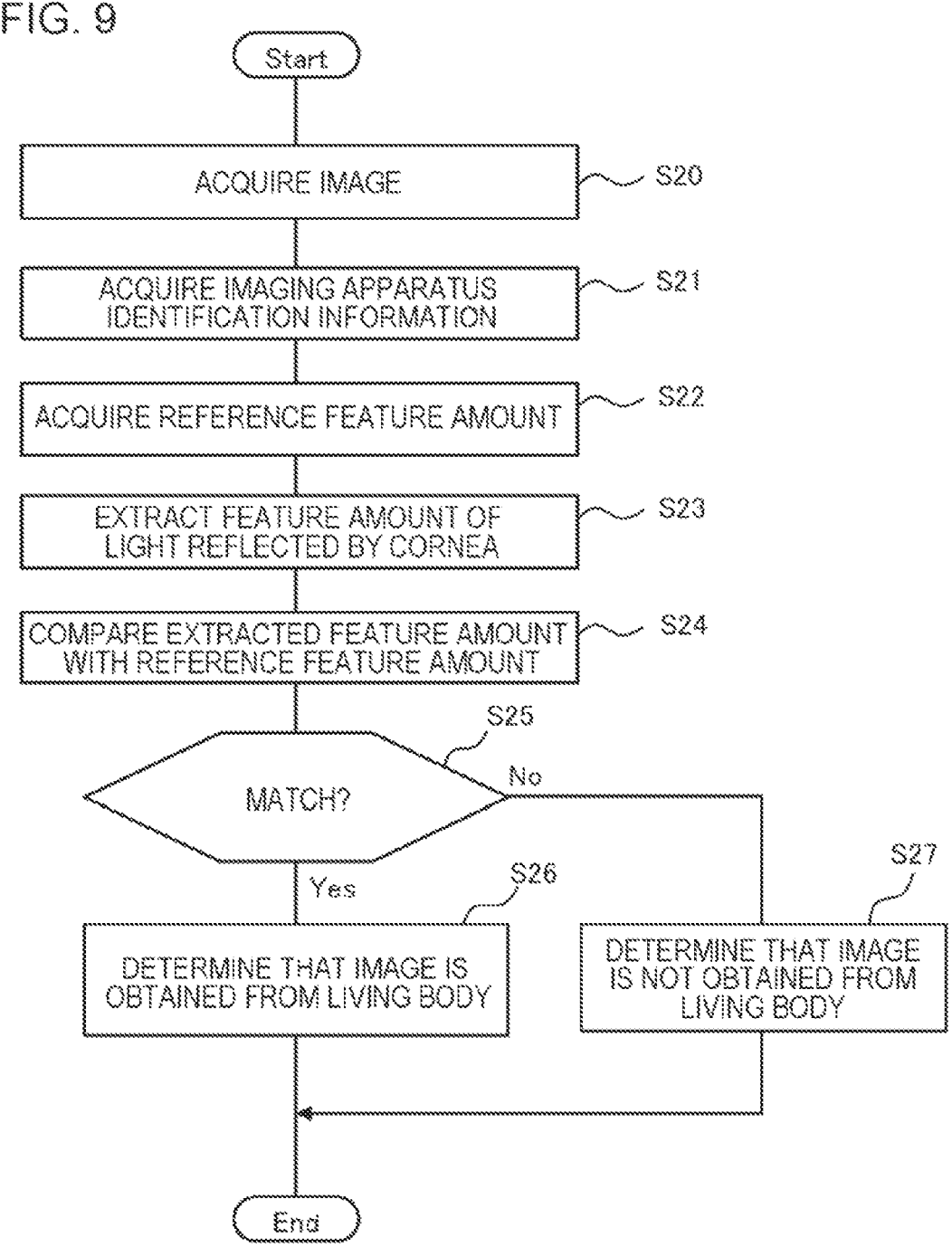
FIG. 9 is a flowchart illustrating one example of the flow of process of the processing system of the present example embodiment.
Figure 10:
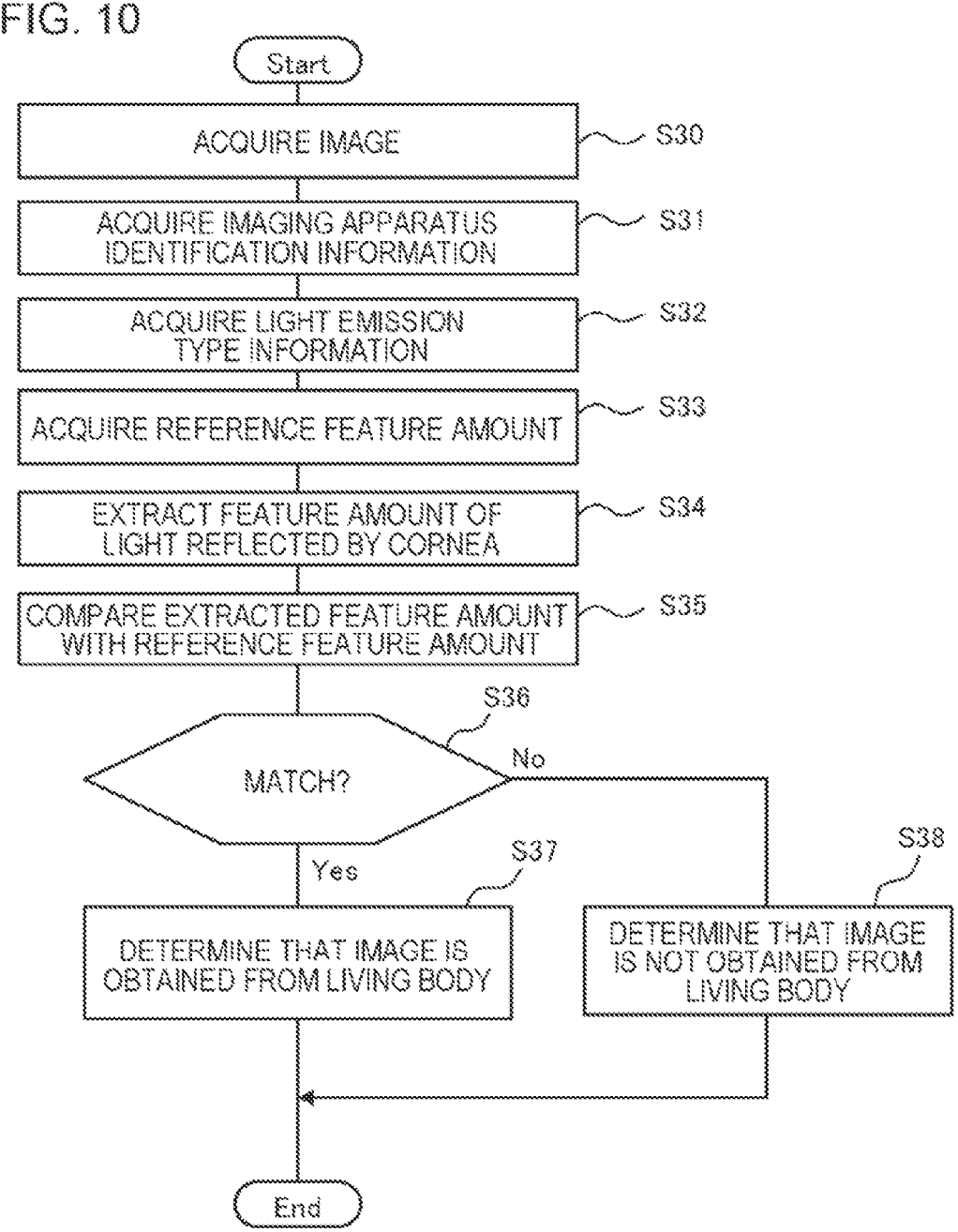
FIG. 10 is a flowchart illustrating one example of the flow of process of the processing system of the present example embodiment.

The processes of S40 to S43 may be replaced with S20 to S25 in FIG. 9 or S30 to S36 in FIG. 10.

Other configurations of the imaging apparatus 10 and the processing system 20 are the same as any of the first to fourth example embodiments.

According to the imaging apparatus 10 and the processing system 20 of the present example embodiment, the accuracy of the biometric detection is improved by combining a plurality of biometric detection processes.

Sixth Example Embodiment

Figure 12:
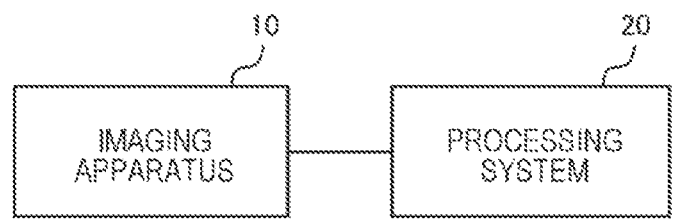
FIG. 12 is a function block diagram for describing one example of the relationship between the imaging apparatus and the processing system of the present example embodiment.

The imaging apparatus 10 and the processing system 20 of the present example embodiment are in a one-on-one relationship as illustrated in FIG. 12. The imaging apparatus and the processing system 20 may be physically and/or logically separated or may be physically and/or logically integrated.

In the case of the present example embodiment, the storage unit 25 of the processing system 20 stores only the reference feature amount of the corresponding imaging apparatus 10. The acquisition unit 21 does not need to acquire the imaging apparatus identification information. Other configurations of the imaging apparatus 10 and the processing system 20 are the same as any of the first to fourth example embodiments.

According to the imaging apparatus 10 and the processing system 20 of the present example embodiment, the same effect as the first to fifth example embodiments can be achieved.

Modification Example

A modification example applicable to all of the example embodiments will be described. The processing system 20 may accumulate the image acquired from each imaging apparatus 10 in association with the imaging apparatus identification information of each imaging apparatus 10. Accumulated data may be used as the training data for generating the inference model (refer to FIG. 6).

A part or the entirety of the example embodiments may be disclosed as in the following appendix but is not limited to the following.

1. A processing system including an extraction unit that extracts a feature amount of light reflected by a cornea of a person from an image generated by a first imaging apparatus, a comparison unit that specifies an imaging apparatus corresponding to the extracted feature amount of the light based on the extracted feature amount of the light and a reference feature amount indicating a feature of light emitted by each of a plurality of imaging apparatuses at a time of imaging, and a biometric detection unit that performs biometric detection based on a result of whether or not the first imaging apparatus matches the specified imaging apparatus.

2. The processing system according to 1, in which the plurality of imaging apparatuses randomly or regularly change the light emitted at the time of imaging, and the comparison unit acquires light emission type information indicating a type of light emitted by each of the plurality of imaging apparatuses when the person is imaged, and specifies the imaging apparatus corresponding to the extracted feature amount of the light based on the light emission type information.

3. A processing system including an extraction unit that extracts a feature amount of light reflected by a cornea of a person from an image generated by a first imaging apparatus, a comparison unit that compares the extracted feature amount of the light with a reference feature amount indicating a feature of light emitted by the first imaging apparatus at a time of imaging, and a biometric detection unit that performs biometric detection based on a result of whether or not the extracted feature amount of the light matches the reference feature amount.

4. The processing system according to 3, in which the first imaging apparatus randomly or regularly changes the emitted light, and the comparison unit acquires light emission type information indicating a type of light emitted by the first imaging apparatus when the person is imaged, and compares the extracted feature amount of the light with the reference feature amount indicating the feature of the light indicated by the light emission type information.

5. The processing system according to any one of 1 to 4, in which the first imaging apparatus generates a plurality of images including the same person by changing the emitted light, and the biometric detection unit performs the biometric detection based on the feature amount of the light extracted from each of the plurality of images.

6. The processing system according to 5, in which the comparison unit compares the feature amounts of the light extracted from the plurality of images with each other, and the biometric detection unit performs the biometric detection based on a result of whether or not the feature amounts of the light extracted from the plurality of images match each other.

7. The processing system according to any one of 1 to 6, in which the extraction unit extracts a feature amount indicating at least one of a pattern of the light and a position of the light in a pupil.

8. The processing system according to any one of 1 to 7, in which the extraction unit extracts the feature amount of the light reflected by the cornea of each of a right eye and a left eye.

9. A processing method executed by a computer, the method including extracting a feature amount of light reflected by a cornea of a person from an image generated by a first imaging apparatus, specifying an imaging apparatus corresponding to the extracted feature amount of the light based on the extracted feature amount of the light and a reference feature amount indicating a feature of light emitted by each of a plurality of imaging apparatuses at a time of imaging, and performing biometric detection based on a result of whether or not the first imaging apparatus matches the specified imaging apparatus.

10. A processing method executed by a computer, the method including extracting a feature amount of light reflected by a cornea of a person from an image generated by a first imaging apparatus, comparing the extracted feature amount of the light with a reference feature amount indicating a feature of light emitted by the first imaging apparatus at a time of imaging, and performing biometric detection based on a result of whether or not the extracted feature amount of the light matches the reference feature amount.

11. A program causing a computer to function as an extraction unit that extracts a feature amount of light reflected by a cornea of a person from an image generated by a first imaging apparatus, a comparison unit that specifies an imaging apparatus corresponding to the extracted feature amount of the light based on the extracted feature amount of the light and a reference feature amount indicating a feature of light emitted by each of a plurality of imaging apparatuses at a time of imaging, and a biometric detection unit that performs biometric detection based on a result of whether or not the first imaging apparatus matches the specified imaging apparatus.

12. A program causing a computer to function as an extraction unit that extracts a feature amount of light reflected by a cornea of a person from an image generated by a first imaging apparatus, a comparison unit that compares the extracted feature amount of the light with a reference feature amount indicating a feature of light emitted by the first imaging apparatus at a time of imaging, and a biometric detection unit that performs biometric detection based on a result of whether or not the extracted feature amount of the light matches the reference feature amount.

While the example embodiments of the present application is described with reference to these embodiments (and examples), the example embodiments is not limited to these embodiments (and examples). The configurations and details of the example embodiments can be subjected to various changes perceivable by those skilled in the art within the scope of the example embodiments.

It is apparent that the example embodiments is not limited to the above embodiment, and may be modified and changed without departing from the scope and spirit of the example embodiments.

This application is based on Japanese patent application No. 2019-105904, the content of which is incorporated hereinto by reference.

REFERENCE NUMERALS

1A: processor
2A: memory
3A: input-output I/F
4A: peripheral circuit
5A: bus
1: server
2: client terminal
10: imaging apparatus
20: processing system
21: acquisition unit
22: extraction unit
23: comparison unit
24: biometric detection unit

What is claimed is:

1. A processing system comprising:
at least one memory configured to store one or more instructions; and
at least one processor configured to execute the one or more instructions to:
acquire an image and identification information of an imaging apparatus which has generated the image;
extract a feature amount of light reflected by a cornea of a person from the image;
compare the extracted feature amount of light with each of reference feature amounts indicating features of light emitted by each of a plurality of imaging apparatuses, and specify an imaging apparatus having a reference feature amount matching the extracted feature amount of light;
compare an identification information of the specified imaging apparatus with the acquired identification information of the imaging apparatus; and
determine that the image is not an image of a living body, in a case where the identification information of the specified imaging apparatus does not match the acquired identification information of the imaging apparatus.

2. The processing system according to claim 1,
wherein the plurality of imaging apparatuses randomly or regularly change the light emitted at the time of imaging, and
wherein the at least one processor is further configured to execute the one or more instructions to:
acquire light emission type information indicating a type of light emitted by each of the plurality of imaging apparatuses when the person is imaged, and specify the imaging apparatus corresponding to the extracted feature amount of the light based on the light emission type information.

3. The processing system according to claim 1,
wherein the imaging apparatus generates a plurality of images including the same person by changing the emitted light, and
wherein the at least one processor is further configured to execute the one or more instructions to perform biometric detection based on the feature amount of the light extracted from each of the plurality of images.

4. The processing system according to claim 3,
wherein the at least one processor is further configured to execute the one or more instructions to:
compare the feature amounts of the light extracted from the plurality of images with each other, and
perform the biometric detection based on a result of whether or not the feature amounts of the light extracted from the plurality of images match each other.

5. The processing system according to claim 1,
wherein the at least one processor is further configured to execute the one or more instructions to extract a feature amount indicating at least one of a pattern of the light and a position of the light in a pupil.

6. The processing system according to claim 1,
wherein the at least one processor is further configured to execute the one or more instructions to extract the feature amount of the light reflected by the cornea of each of a right eye and a left eye.

7. A processing method executed by a computer, the processing method comprising:

acquiring an image and identification information of an imaging apparatus which has generated the image;

extracting a feature amount of light reflected by a cornea of a person from the image;

comparing the extracted feature amount of light with each of reference feature amounts indicating features of light emitted by each of a plurality of imaging apparatuses, and specifying an imaging apparatus having a reference feature amount matching the extracted feature amount of light;

comparing an identification information of the specified imaging apparatus with the acquired identification information of the imaging apparatus; and determining that the image is not an image of a living body, in a case where the identification information of the specified imaging apparatus does not match the acquired identification information of the imaging apparatus.

8. A non-transitory storage medium storing a program causing a computer to:

acquire an image and identification information of an imaging apparatus which has generated the image;

extract a feature amount of light reflected by a cornea of a person from the image;

compare the extracted feature amount of light with each of reference feature amounts indicating features of light emitted by each of a plurality of imaging apparatuses, and specify an imaging apparatus having a reference feature amount matching the extracted feature amount of light;

compare an identification information of the specified imaging apparatus with the acquired identification information of the imaging apparatus; and determine that the image is not an image of a living body, in a case where the identification information of the specified imaging apparatus does not match the acquired identification information of the imaging apparatus.

9. The processing system of claim 1, wherein the feature of light emitted by each of the plurality of imaging apparatuses are different from each other.

* * * * *